No. 656,787. Patented Aug. 28, 1900.
J. S. GRANGE.
IMPLEMENT FOR LAYING OFF AND PULVERIZING GROUND.
(Application filed July 5, 1900.)
(No Model.)
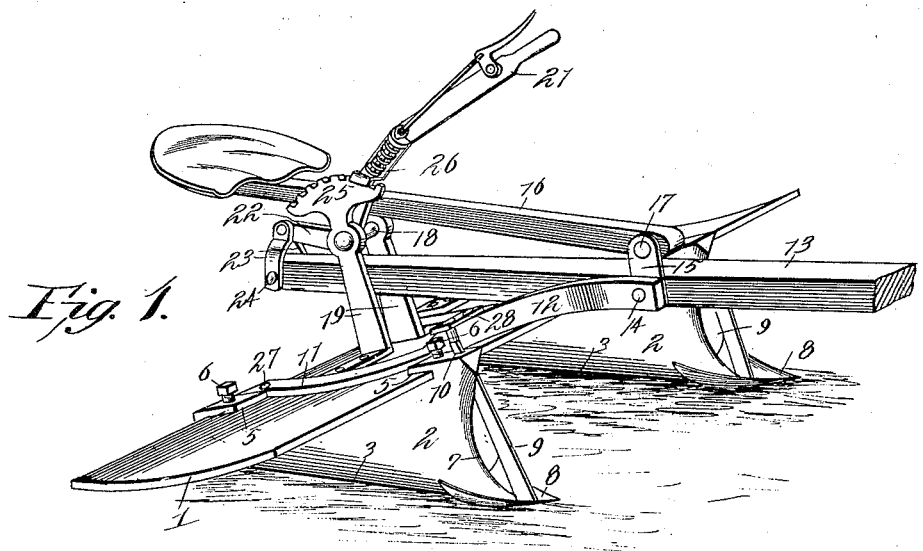
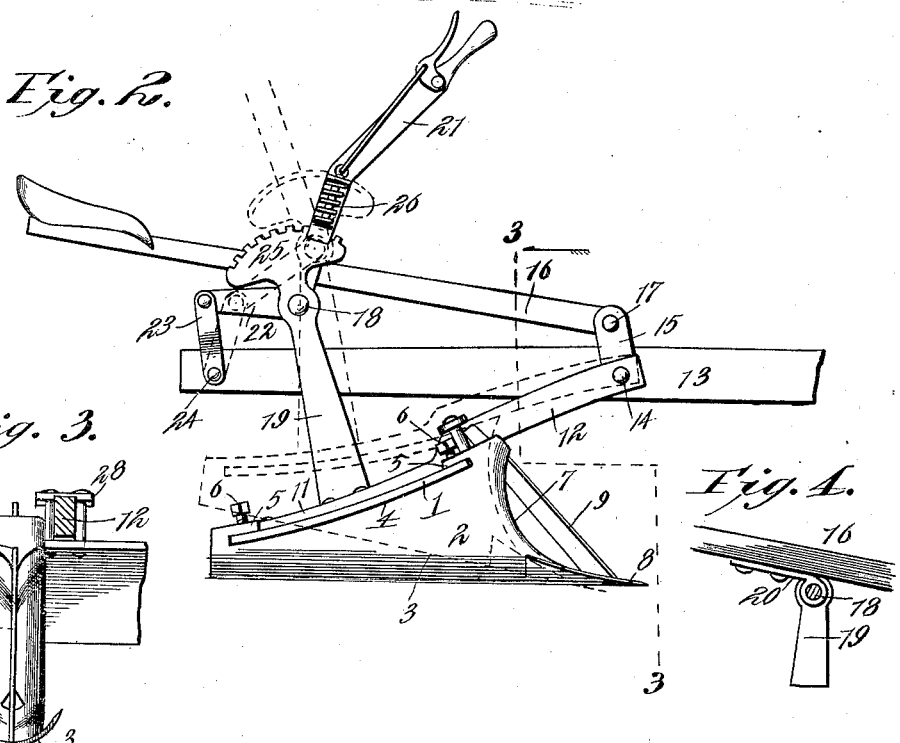
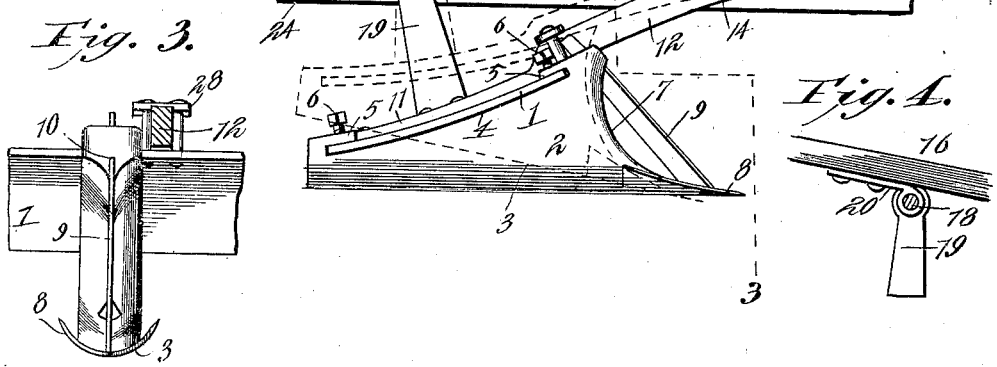
Witnesses
C. N. Walker
J. W. Garnor
J. S. Grange Inventor
by C. A. Snow & Co.
Attorneys
THE NORRIS PETERS CO., PHOTO-LITHO., WASHINGTON, D. C.

UNITED STATES PATENT OFFICE.

JOSEPH S. GRANGE, OF ORANGEVILLE, UTAH, ASSIGNOR OF TWO-THIRDS TO IRA R. BROWNING AND FRANK CARROLL, OF SAME PLACE.

IMPLEMENT FOR LAYING OFF AND PULVERIZING GROUND.

SPECIFICATION forming part of Letters Patent No. 656,787, dated August 28, 1900.

Application filed July 5, 1900. Serial No. 22,622. (No model.)

*To all whom it may concern:*

Be it known that I, JOSEPH S. GRANGE, a citizen of the United States, residing at Orangeville, in the county of Emery and State of Utah, have invented a new and useful Implement for Laying Off and Pulverizing Ground, of which the following is a specification.

My invention is an improved implement for pulverizing ground and laying off the same in parallel furrows ready for planting.

My invention is an improvement on the implement for which Letters Patent of the United States No. 625,646 were granted to E. M. Cox and myself May 23, 1899.

One object of my present invention is to effect improvements whereby the laying-off plows are adapted to be adjusted to narrow or widen the spaces between the furrows, as may be required.

Another object of my present invention is to effect improvements in the connections between the implement and the tongue.

My invention consists in the peculiar construction and combination of devices hereinafter fully set forth, and pointed out in the claim.

In the accompanying drawings, Figure 1 is a perspective view of my improved implement. Fig. 2 is a side elevation of the same. Fig. 3 is a detail front elevation, partly in section, on the line 3 3 of Fig. 2. Fig. 4 is a detail view showing the connection between the seat-bar and the standards.

The platform 1 is made of any suitable material and is slightly curved. The plow-stocks 2 are of the form here shown, being elongated from their front to their rear sides and semicylindrical in form on their lower sides, as at 3. The said plow-stocks are higher in front than in rear, and their upper sides are inclined, as at 4, and adapted to bear against the under side of the platform 1, which the plow-stocks serve to support. The plow-stocks are further provided on their upper sides with lips 5, which overlap and bear upon the upper side of the platform at the front and rear sides thereof, thereby adapting the plow-stocks to be moved laterally and adjusted to any required distance apart. Bolts 6, which operate in threaded openings in the projecting lips 5, are adapted to clamp the plow-stocks firmly in position on the platform at any required adjustment. It will be understood from the foregoing and by reference to the drawings that the platform is supported in an inclined position, its front side being higher than its rear side, and in operation the shares working in the soil and forming furrows therein. The platform by frictional contact with the soil and bearing on the same operates to break up the clods and level and pulverize the soil. The plow-stocks are provided at their front ends with curved cutting edges 7, which are centrally disposed. Curved points 8 are secured to the under side of the plow-stocks at the front ends thereof and project forward therefrom, and rearwardly-inclined colters 9 extend from the upper sides of said points 8 through openings 10, with which the stocks are provided.

Braces 11 are disposed on the platform 1 and secured thereto, and said braces are formed with forward-extending arms 12, which converge toward each other in advance of the platform, and between the front ends of the said arms is disposed the tongue 13, a pivotal bolt 14 passing through the front ends of said arms and through the said tongue. A pair of plates 15 are disposed on opposite sides of the tongue, between the same and the ends of the arms 12, and said plates are secured on the bolt 14 and project above the upper side of the tongue, as shown. A seat-bar 16 has its front end secured between the upper ends of the plates 15 by a bolt 17. The said seat-bar is further supported at a suitable distance from its rear end by a bolt 18, which connects a pair of standards 19, that are bolted to and rise from the platform 1. The said bolt 18 passes through a keeper 20, bolted to the seat-bar, and is disposed on the lower side thereof. A hand-lever 21 is fulcrumed on the bolt 18 and at its lower end is provided with a rearward-extending arm 22. A pair of links 23 are pivotally attached at their upper ends to the rear end of said arm 22 and have their lower ends pivotally attached to opposite sides of the tongue at the rear end of the latter by a bolt 24. One of the standards 18 is provided at its upper end with a toothed segment 25, which is engaged by a spring-pressed dog 26 of the usual construction, with which the lever 21 is provided, whereby the latter may be secured in any desired position.

It will be understood from the foregoing and by reference to the drawings that the platform and plow-stocks may be adjusted to any required angle, so as to regulate the depth at which the plows operate, and hence adapt the implement for making furrows of any desired depth.

The rear ends of the braces 11 are secured on the platform 1 by bolts, as at 27, and said braces are secured on the platform near the front side of the latter by clip-bolts 28. It will be observed that the inclination of the seat-bar is not changed by varying the inclination of the platform and the furrowing-plows.

Having thus described my invention, I claim—

The pulverizing and laying-off implement comprising the platform, the plow-stocks adjustable laterally thereunder, said plow-stocks supporting said platform and having the lips or flanges engaging the upper side thereof, the braces secured on the platform and having the forward-extending arms, the tongue pivoted between said arms, the standards on the platform, the hand-lever fulcrumed on a bolt connecting said standards, the seat-bar, supported on said bolt and having its front end secured on the tongue, and the links connecting the hand-lever to the rear end of the tongue, substantially as described.

In testimony that I claim the foregoing as my own I have hereto affixed my signature in the presence of two witnesses.

JOSEPH S. GRANGE.

Witnesses:
H. C. FARRER,
A. A. FARRER.